(12) United States Patent
Ericsson et al.

(10) Patent No.: US 10,767,711 B2
(45) Date of Patent: Sep. 8, 2020

(54) SAFETY COUPLING

(71) Applicant: VOITH PATENT GMBH, Heidenheim (DE)

(72) Inventors: Robert Ericsson, Delsbo (SE); Mikael Jacobs, Naesviken (SE); David Bergstroem, Hudiksvall (SE); Per-Olof Berg, Hudiksvall (SE); Axel Bohler, Iggesund (SE); Jonas Loefgren, Forsa (SE); Daniel Fors, Njutanger (SE); Kjell-Erik Larsson, Delsbo (SE); Erik Nordstroem, Hudiksvall (SE); Niclas Olsson, Soederhamn (SE)

(73) Assignee: Voith Patent GmbH, Heidenheim (DE)

( * ) Notice: Subject to any disclaimer, the term of this patent is extended or adjusted under 35 U.S.C. 154(b) by 183 days.

(21) Appl. No.: 15/761,871

(22) PCT Filed: Sep. 20, 2016

(86) PCT No.: PCT/EP2016/072262
§ 371 (c)(1),
(2) Date: Mar. 21, 2018

(87) PCT Pub. No.: WO2017/050742
PCT Pub. Date: Mar. 30, 2017

(65) Prior Publication Data
US 2018/0298960 A1  Oct. 18, 2018

(30) Foreign Application Priority Data
Sep. 21, 2015  (EP) .................................... 15186010

(51) Int. Cl.
*F16D 43/14* (2006.01)
*F16D 9/00* (2006.01)
(Continued)

(52) U.S. Cl.
CPC .......... *F16D 43/14* (2013.01); *F16D 1/0805* (2013.01); *F16D 9/00* (2013.01); *F16D 9/06* (2013.01);
(Continued)

(58) Field of Classification Search
CPC .. F16D 43/14; F16D 2043/145; F16D 1/0805; F16D 9/00; F16D 43/04; Y10T 403/11
See application file for complete search history.

(56) References Cited

U.S. PATENT DOCUMENTS 4,752,275 A * 6/1988 Lindenthal ............ F16D 1/0805
                                                    403/2
2001/0054534 A1* 12/2001 Lambertini ............. F16D 43/18
                                                    192/105 CD
(Continued)

FOREIGN PATENT DOCUMENTS

DE      19537249 A1    4/1997

*Primary Examiner* — Stacey A Fluhart
(74) *Attorney, Agent, or Firm* — Laurence A. Greenberg; Werner H. Stemer; Ralph E. Locher

(57) ABSTRACT

A safety coupling has a driving coupling member engaged with a driven coupling member by a frictional connection. The frictional connection can be disconnected by activation of a release element. The release element can be activated by a centrifugal device wherein a centrifugal unit of the centrifugal device is radially moveable to interact with a shift gate in dependence of the revolution speed of the centrifugal unit and the slip between the driving coupling member and the driven coupling member. The centrifugal device includes a stop to limit the centrifugal force applied to the centrifugal unit.

16 Claims, 4 Drawing Sheets

(51) Int. Cl.
*F16D 1/08* (2006.01)
*F16D 43/04* (2006.01)
*F16D 9/06* (2006.01)

(52) U.S. Cl.
CPC ........ *F16D 43/04* (2013.01); *F16D 2043/145* (2013.01)

(56) References Cited

U.S. PATENT DOCUMENTS

2003/0047404 A1\* 3/2003 Falk ...................... F16D 1/0805
                                                        192/56.3
2010/0272502 A1\* 10/2010 Nagayama .............. F16D 7/021
                                                        403/2
2014/0224611 A1   8/2014 Falk et al.

\* cited by examiner

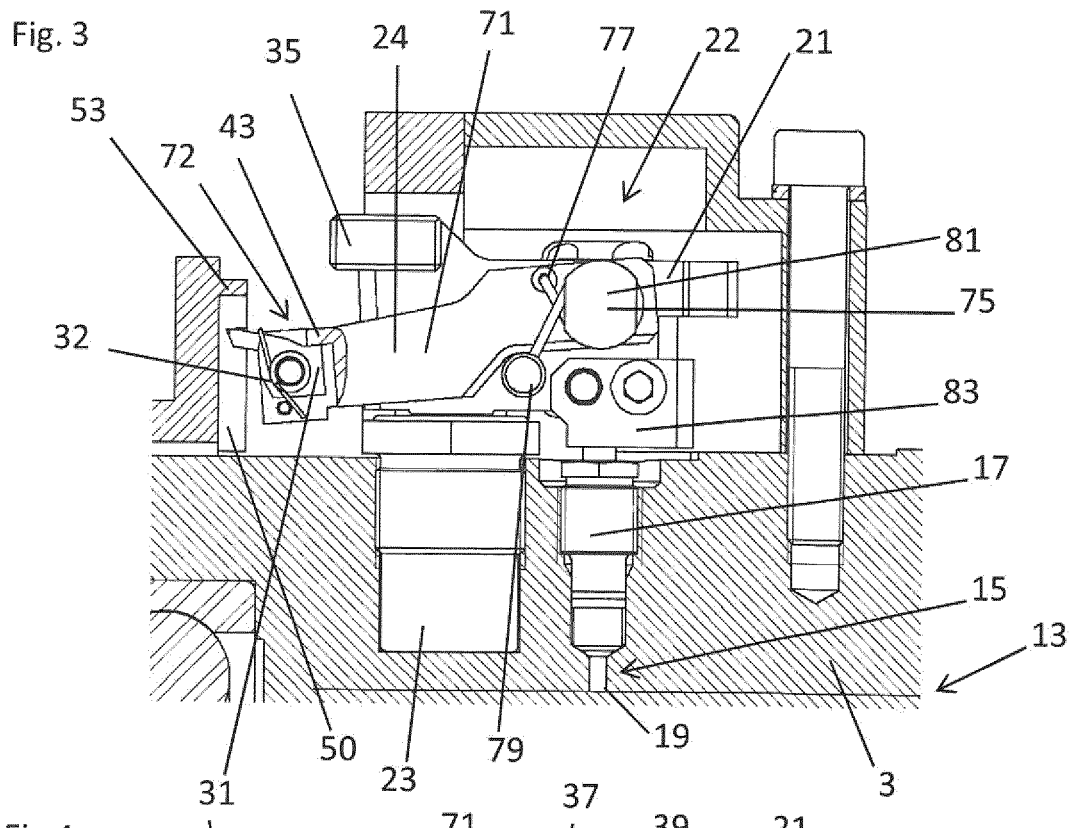
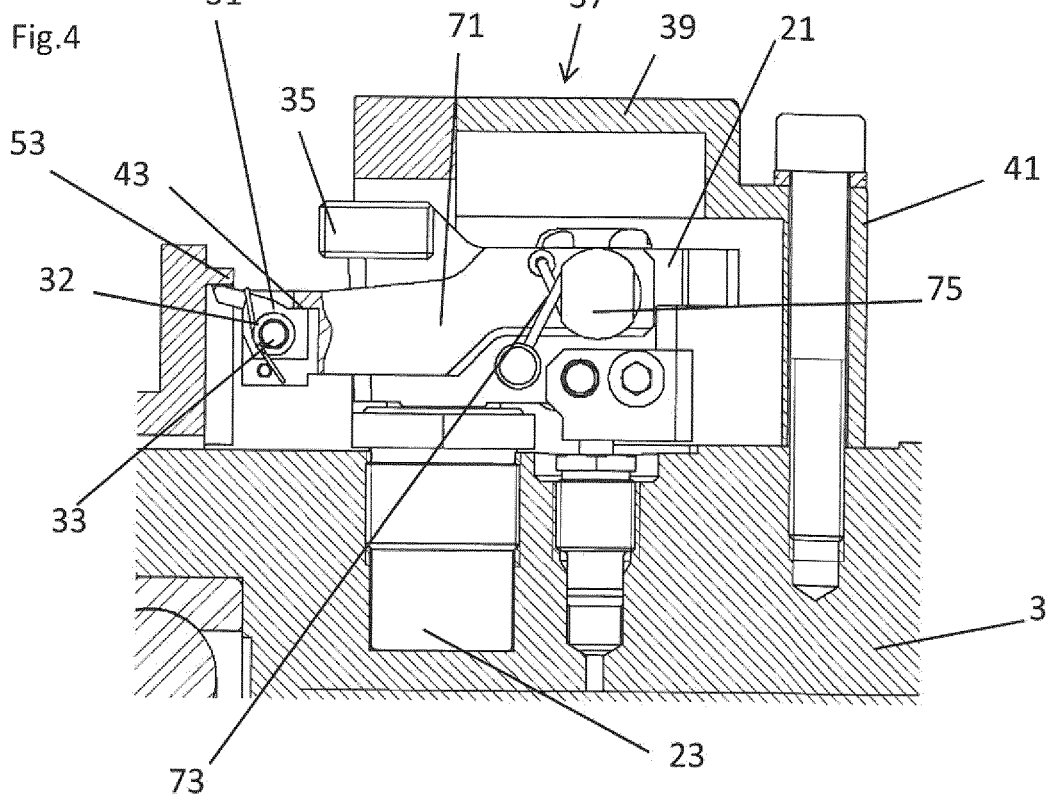

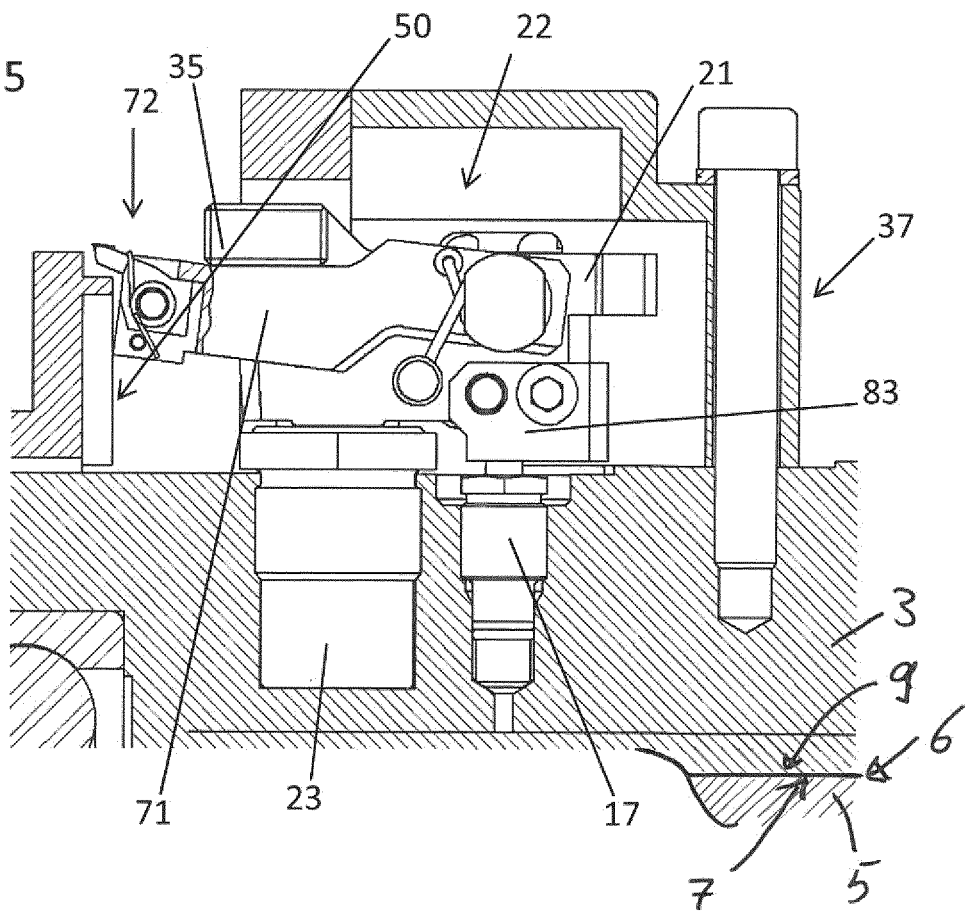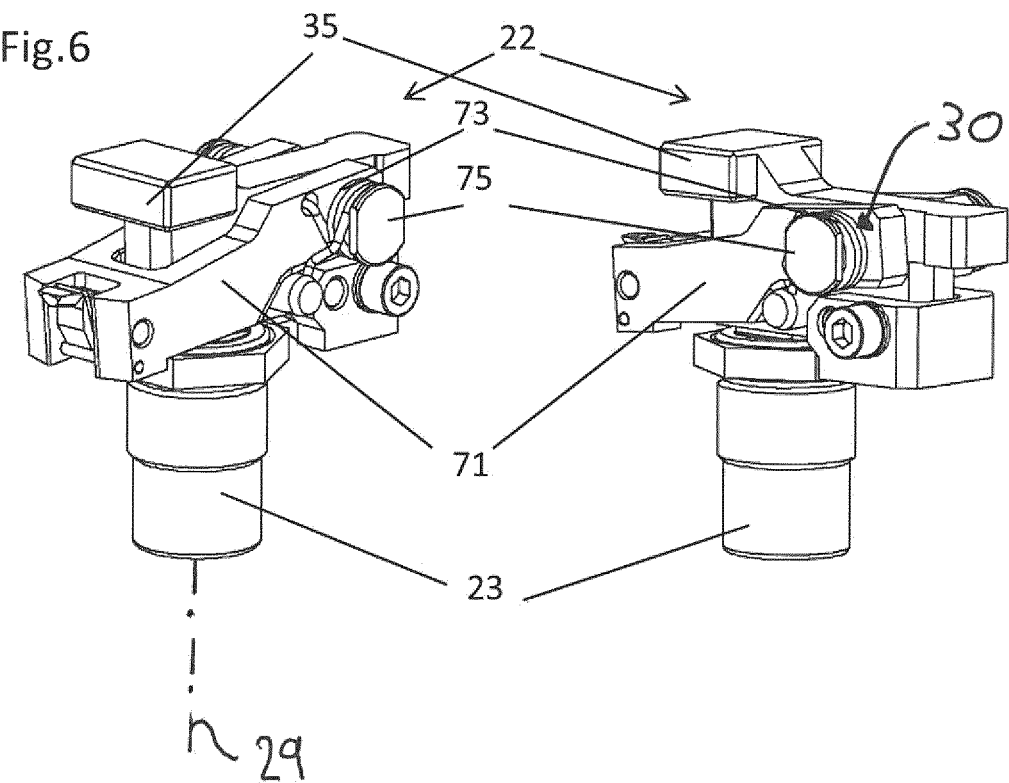

SAFETY COUPLING

TECHNICAL FIELD OF THE INVENTION

The present invention relates generally to a safety coupling. The safety coupling comprises a torque-transmitting coupling unit with one driving coupling member and one driven coupling member in friction engagement. The torque transmitting coupling is equipped with an overload protection mechanism.

Voith Turbo Safeset AB delivers such torque transmitting couplings with an overload protection under the name SafeSet and SmartSet.

The SafeSet principle is simple: friction and flexibility. No material fatigue, a constant torque transmission and adaptability. SafeSet couplings are available for the most demanding application requirements. Some of the available design options: Torque release between 1 and 20000 kNm, adjustable torque settings from 50 to 100% of max torque setting, slip and release mechanism at a preset torque, immediate release for over-torque situations. The SafeSet coupling includes a twin-walled hollow sleeve. A friction connection is provided by surface pressure. Therefore the twin wallet hollow sleeve is expanded by pressurized hydraulic oil. The integrated shear tube holds pressure to ensure a constant, but easily adaptable torque transmission. In an overload situation the coupling slips and the shear tube shears off. Oil pressure drops and the frictional surfaces separate. The coupling rotates on bearings without transmitting any torque.

SmartSet is a process improving coupling with controlled slip. It has the ability to slip without releasing to reduce short duration and dynamic torque peaks. SmartSet improves processes and maximizes the output of the application by functioning as an adjustable peak shaver. It can reduce system transient torques with short slippages, without releasing. It can be adapted for start-ups or continuous drives that experience many short peaks. The technology is the same as for the SafeSet coupling, but it is equipped with a centrifugal device named SmartSet Device that will give the coupling an additional slip feature. This centrifugal device is activated by the rotational speed of the intended application. This enables the coupling to slip during high transient torques. If the torque peak is of long duration in an overload situation, like a complete blockage, the SmartSet coupling can fully release as a normal SafeSet coupling and subsequently save the drive train from catastrophic failure. Torque capacity available between 10 to 10000 kNm. The SmartSet can be used up to 1000 rpm. At higher rotational speed the centrifugal device breaks.

The centrifugal device of the SmartSet comprises a shaft, centrifugal unit preloaded by a spring, a radial moveable sleeve, a main lever, a stop lever rotatable mounted on the main lever and preloaded by a spring. The rotational movement of the stop lever is limited by a stop, wherein the stop is arranged at the main lever. Further the main lever comprises an opening for receiving the shear tube. The main lever is mounted pivotable and radial movable on the shaft of the centrifugal device. In the case the main lever pivots the shear tube shears off and the oil pressure drops off and the frictional surfaces of the driven and driving elements separates. A pivot of the main lever is activated by a shifting gate with release projections. If the SmartSet device is mounted on the driving element, the shifting gate with the release projection is fixed in respect of the driven element. So a shear off of the shear tube will take place in the case of slippage over a predetermined angle.

US 2014/0224611 A1 discloses a safety coupling. The safety coupling comprises a actuatable safety mechanism. The safety mechanism is actuatable in a displacement from an initial active position to a final inactive position. The safety mechanism comprises centrifugal devices arranged within housing. The housing surrounds further a hub plate, trigger element, a counter balance element and a drive plate. The centrifugal device has two units which are movable by rotary motion in a radial manner. When the rotary motion exceeds a preselected rotary motion further applied torque results in an engagement by opening a valve assembly.

DE 195 37 249 A1 discloses a further safety clutch. A single drive motor is coupled to a reduction gear which is, in turn, coupled to a distributor unit driving universal joint shafts by a clutch which may be hydraulically varied to suit the required conditions. A motor unit for driving a pair of shafts is joined by means of a rotationally rigid coupling to a reduction gear with an output shaft. A controlled slip clutch unit couples a output shaft to a shaft driving a distributor gear box, providing two output speeds to universal couplings and hence the rollers. The safety clutch unit may consist of a thick-walled housing in which is an annular cavity connected to a source of hydraulic fluid. The cavity may be pressurised or evacuated according to the load requirements to provide a limiting transmission of power.

It is an object of the invention to provide a safety coupling which can be used at high revolution speed applications, especially at revolution speed exceeding 1000 rpm.

It is further the object of the invention to provide a safety coupling which is able to provide a predetermined duration of time before a decoupling by the safety coupling is activated and which is compact.

It is further an object of the invention to provide a safety coupling which is able to provide a predetermined minimum slipping angle before a decoupling by the safety coupling is activated.

SUMMARY OF THE INVENTION

The object of the invention is solved by a safety coupling comprising a driving coupling member engaged with a driven coupling member by a frictional connection. The frictional connection can be disconnected by activation of a release element. The release element can be activated by a centrifugal device. The centrifugal device comprises a centrifugal unit. The centrifugal unit is moved by centrifugal force to interact with a shifting gate in dependence of the revolution speed of the driving coupling member (3) and a slippage between the driving coupling member and the driven coupling member. The centrifugal device comprises a stop to limit the movement of the centrifugal unit and to limit the affective force applied to the centrifugal unit caused by the revolution speed. Revolution speed is the revolution speed of the driven coupling member. The centrifugal unit comprises a rotatable supported main lever. The main lever is mounted rotatable. At least an interacting side of the main lever is moving in radial direction in dependence of the revolution speed and interacts with the shifting gate.

The interaction with the shifting gate depends from the revolution speed and the slip between the driving coupling member and the driven coupling member. By the main lever it is possible to reduce the weight of the centrifugal unit moved by applied centrifugal force. As the stop has to be adapted to the applied centrifugal forces which have to be taken over by the stop the dimensions of the stop can be chosen smaller in the case of a reduced weight of the centrifugal unit.

The radial direction is aligned at a right angle in respect to the rotation axis of the driving or driven coupling member. The driving coupling member is also named as driving shaft. The driven coupling member is also named driven shaft.

A tangential direction is aligned at a right angle to the radial direction and at a right angle to the rotational axis of the driving or driven shaft. The centrifugal device comprises a stop to limit the movement of the centrifugal unit in radial direction. The movement is induced by centrifugal force. The centrifugal unit moves in dependence of the rotational speed in radial direction. The radial movement of the centrifugal unit is limited by the stop. After the predetermined movement the centrifugal unit and the stop are in contact. So the load applied to the centrifugal unit is limited by the stop. So a breakage can be avoided.

In a preferred embodiment, the centrifugal unit comprises a rotatable supported main lever. The rotation shaft is arranged tangential to at least one of the driven or driving shaft. The main lever interacts with the shifting gate. Thereby it is possible to provide a compact centrifugal unit.

In a preferred embodiment the main lever is preloaded by a spring element, wherein the interacting side of the main lever is moving in radial direction in respect of the rotational speed. If the center of gravity of the main lever is on the interacting side then the interacting side is moving outwardly with rising rotational speed.

In a preferred embodiment the centrifugal device comprises a release device. The release device is rotatable supported in respect of a supporting shaft. Thereby the supporting shaft is arranged angled, preferably aligned in radial direction in respect to the rotation axis of the driving and/or driven coupling member. The release device is moved by the centrifugal unit. If the release device is rotated about the supporting shaft, the release element is activated. In the case the release element is activated, the connection between the driving coupling member and the driven coupling member is disengaged.

In a preferred embodiment the release device and the stop are one piece and preferably one piece with supporting shaft, wherein the supporting shaft is joint with the driving coupling member. The supporting shaft is movable in respect of the axial axis of the supporting shaft but fixed in radial direction in respect of the radial direction of the driving coupling member. Thereby it is possible to reduce the needed pieces and thereby to reduce the costs.

In a preferred embodiment, the main lever and the release element are separate elements which are connected, wherein a movement of the main lever introduced by the shifting gate causes a rotation movement of the release device.

In a preferred embodiment the centrifugal device comprises a release element housing removable connected to the release device and/or the centrifugal unit. The release element housing is removed for exchange of the release element. This solution has the advantage that the safety coupling can be very compact and demount of the main lever for exchange of the release element is not needed. The release element housing takes care that the release element is activated by a rotational movement of the release device about the supporting shaft.

In a preferred embodiment the stop is a part of the release device. So in the case of resting of the centrifugal unit, especially of the main lever, on the stop no relative movement of the stop and the centrifugal unit takes place in case of rotational movement of the release device.

By the use of an centrifugal unit moved in dependence of centrifugal force and a separate release device, which is not moved in dependence of the applied centrifugal force, the stability and thereby the weight of the centrifugal unit can be reduced.

In a preferred embodiment the centrifugal unit and the release device are separated parts. Only the centrifugal unit is moving in radial direction in dependence of the rotational speed of itself. The release device is in engagement with the centrifugal unit to transmit a movement to the release device initiated by the shifting gate and the centrifugal unit. A radial movement of the centrifugal unit does not affect the release device. Especially the centrifugal device is in rotational engagement with the centrifugal unit. If the centrifugal unit is moved, especially rotated, by an interaction with the shifting gate, then the movement is transmitted to the release device to release the release element. This embodiment has the advantage that the weight of the radial moving part is reduced. Thereby the effective centrifugal force is reduced. This enables to provide a centrifugal device with reduced weight.

In one embodiment the stop is part of a housing surrounding the centrifugal device. By the stop the effective centrifugal force to act on the centrifugal unit is limited.

The safety coupling can be used in applications with a rotational speed exceeding 1000 rpm, preferably exceeding 1500 rpm up to 3600 rpm plus 10% over speed.

In a preferred embodiment the shifting gate comprises an even number of release projections. This has the advantage, that balancing out the safety coupling can be conducted with reduced effort.

In a preferred embodiment the shifting gate comprises sectional projections to provide an elongated slippage before release.

In a preferred embodiment the shifting gate comprises lower release projection. The lower release projections effect a release of the safety coupling at low rotational speed. So if there is a blockage during the start of rotational movement of the driving coupling member a release is activated by the lower release projections. To provide a balanced out safety coupling it is of advantage to have an even number of lower release projections.

The safety coupling is designed for a driveline comprising a gas turbine or a gas motor and a generator. Such drivelines are especially used to provide electrical energy. The safety coupling is arranged between the gas motor or gas turbine and the generator.

In a preferred embodiment of a driveline a gear is arranged between the gas turbine or gas motor and the generator. The safety coupling is arranged between the gas turbine or the gas motor and the gear.

Such drivelines are used to provide electrical energy and introduce the electrical energy into the electrical grid. Because of the increasing numbers of small energy providers applying electrical energy into the electrical grid, the grid becomes more sensitive. To stabilize the electrical grid it is a need to apply electrical energy after a predetermined amount of time after failure of an energy provider. By the use of the safety coupling of the invention it is possible to provide electrical energy during slippage.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the present preferred embodiments together with the accompanying drawings.

FIG. 3: shows a side view of the embodiment of an safety coupling with the centrifugal device at innermost position FIG. 4: shows the side view of a safety coupling at an middle position;

FIG. 5: shows the safety coupling at an outermost position;

FIG. 6: show the safety coupling in 3-D illustration;

DETAILED DESCRIPTION OF THE PREFERRED EMBODIMENTS

Figure 1:
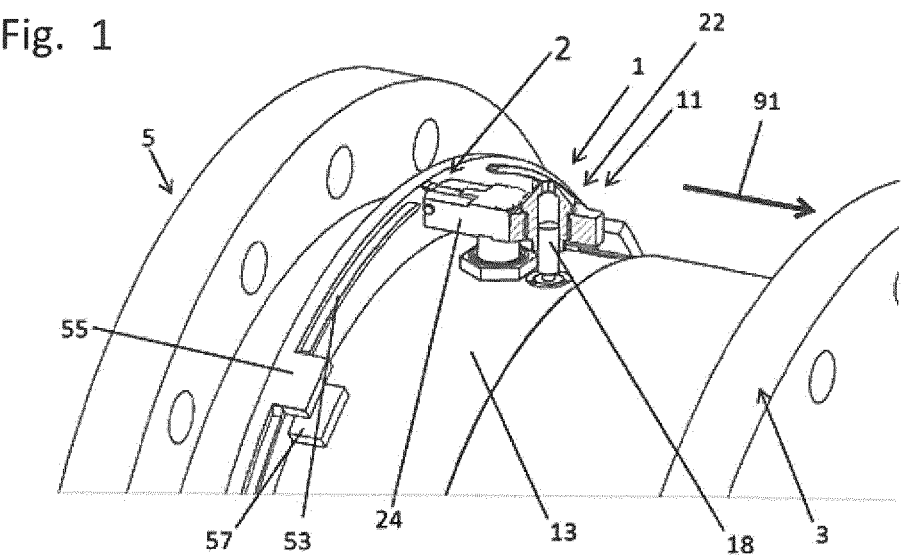
FIG. 1: shows a 3-D view of a safety coupling.

FIG. 1 shows a driving coupling member 3 in engagement with a driven coupling member 5. In the shown examples the driven coupling member 5 and the driving coupling member 3 are in frictional engagement, as shown in FIG. 5. The engagement is provided by twin walled hollow sleeve 13, shown in FIGS. 3 to 5. The twin walled hollow sleeve 13 is part of the driving coupling member or connectable to driving coupling member. The frictional surface 7 of the driving coupling member 3 is in engagement with the frictional surface 9 of the driven coupling member 5 as shown in FIG. 5. For an engagement of the driving 3 and driven coupling member 5 the twin walled hollow sleeve 13 is filled with a hydraulic fluid 15 at a predetermined pressure to ensure an engagement up to a predetermined torque.

It is also possible to provide the connection of the driving coupling member and the driven coupling member by a different mechanism, for example a preloaded form-fitted connection, wherein a release of the form-fitted connection can be released by a safety coupling mechanism. A preloading can be provided for example by a spring element.

In the shown embodiment of FIG. 1 a safety coupling 1 is mounted on the driving coupling member 3. The safety coupling 1 acts as an overload protection mechanism 11.

Figure 7:
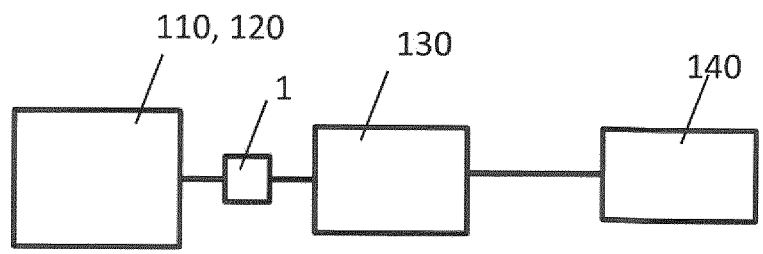
FIG. 7: shows a driveline comprising a safety coupling of the invention

The driven coupling member 5 comprises a shifting gate 50. The shifting gate 50 is arranged in radial direction 93 of the driven coupling member 5. The shifting gate comprises lower release projections 57 and release projections 55. The lower release projections 57 are arranged at a lower radius as release projections 55. A lower release projection 57 initiates a disengagement of the driving coupling member and the driven coupling member at low rotational speed. FIG. 3 and FIG. 7 shows different embodiments of an safety coupling 1 at its innermost position. If the safety coupling 1 is at the innermost position and a slippage between the driving coupling member and the driven coupling member occurs, a release of the safety coupling is activated by one of the lower release projections. Low rotational speed is typical the speed up to 100 rpm.

Figure 2:
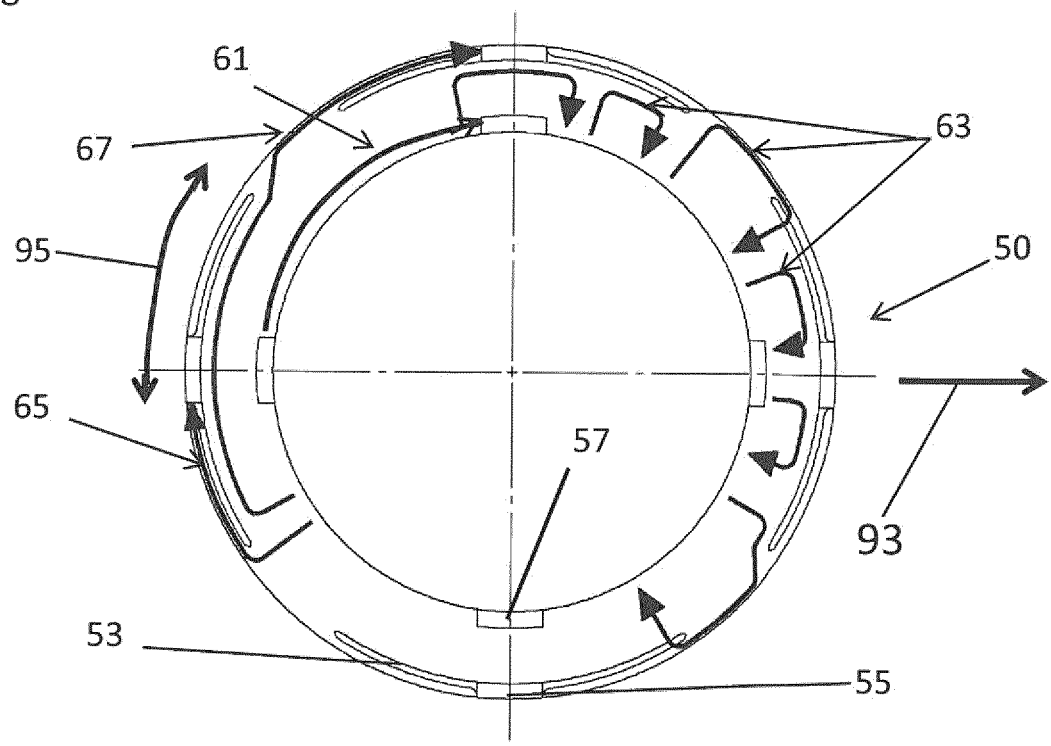
FIG. 2: shows the slippage of the safety coupling of FIG. 1

By the selection of the radial position of the lower release projection 57 and the extension in radial direction 93 of the lower release projections 57 a disengagement of the driving coupling member 3 and the driven coupling member 5 is predetermined. By the number of the lower release projections 57 and a tangential distance between the lower release projections 57 the maximum angle of slippage is predetermined. The Maximum of slippage before release at low rotational speed is shown with reference 61. In FIG. 2 an example with four lower release projections 57 is shown.

In the example shown in FIGS. 1 and 2, the release projections 55 are combined with sectional projections 53. By the use of sectional projection the maximum of slippage angle can be elongated. The safety coupling 1 can be only activated by the release projection 55 if the interacting part of the safety coupling 2 is at a radial position above the sectional projections 53. In this embodiment the interacting part 2 is moving in radial direction outwardly with increasing rotational speed. In the shown example four release projections 55 and four sectional projections 53 are provided. The sectional projections 53 provide an elongated slippage before an release can be initiated by the release projections. To provide a greater maximum slippage angle the number of release projection 55 can be reduced. The longest slippage at high rotational speed before release is shown in FIG. 2 with reference 67. The shortest slippage at high speed before release is shown with reference 65. Slippage produced by short torque peaks are shown in FIG. 2 with reference 63. The short torque peaks resulting in short slippages 63 are shorter than the shortest slippage of high speed 65 needed for release of the safety coupling.

In FIG. 3 to FIG. 6 one embodiment of a safety coupling is shown. The safety coupling 1 is shown in sectional view. The safety coupling comprises a centrifugal device 22 to provide an overload protection mechanism 11. The centrifugal device 22 comprises a centrifugal unit 24. The centrifugal unit comprises a main lever 71. The main lever 71 is preloaded by a spiral spring 73 as shown in FIG. 6. The spiral spring 73 comprises two legs. The coil of the spiral spring is mounted on a mounting element 81. In this case the coil of the spring 73 is mounted on a rotation shaft 75 of the main lever 71. One leg of the spring 71 is connected with the main lever by a first spring connection 77. A second leg of the spring 73 is connected with a second stationary spring connection 79. The release element 17 in form of a shear tube is surrounded by a housing 83 of the release element 17. The housing 83 of the release element 17 is securely mounted to the release device 21 by screws and can be removed for exchange of the release element 17. To make the centrifugal device 22 compact, the release element 17 is mounted in the driving coupling member 3 partly below the main lever 71. A hydraulic channel 19 is closed by the release element 17. The release element comprises a head 18 which is sheared off by rotation of the release device 21. The release device 21 is rotational mounted on a supporting shaft 23. The supporting shaft 23 is within the driving coupling member 3. The supporting shaft has an axial axis 29.

The main lever 71 has an interacting side 72. The interacting side 72 interacts with the shifting gate 50, especially the release projections 55 and the lower release projections 57 and the sectional projections 53. In the shown embodiment the main lever comprises a stop lever 31. The stop lever 31 is mounted on mounting shaft 33. The mounting shaft 33 is aligned in tangential direction 95 in respect of the rotation of the driving coupling member 3. In the case of a centrifugal force applied to the main lever 71 and movement of the interacting side 72 of the main lever 71 in radial direction outwards, the stop lever 31 interacts with a stopper 43 and the movement is limited up to the sectional projections 53. In case of short peaks of slippage 63, the main lever 71 moves in radial direction 93. In the case the main lever 71 with the stop lever 31 moves in radial direction beyond the sectional projections 53, after the short slippage the main lever 71 is moving radial inwards whereby the stop lever 31 is turned to overcome the sectional projection 53. The stop lever 31 is preloaded by a spring 32.

By applying centrifugal force the main lever 71 moves outwards up to a centrifugal stop 35. In this embodiment the centrifugal stop 35 is arranged at the release device 21, wherein the release device 21 is part of the centrifugal device 22.

The centrifugal unit 24 comprises the stop lever 31 and the main lever 71. The main lever is preloaded by a spiral spring 73 and the stop lever is preloaded by a spring 32. The stop lever 31 is arranged at the interacting side 72 of the centrifugal unit 24. In the case a slippage occurs and the interacting side 72 of the centrifugal unit 24 are elongated beyond the sectional projections 53 and interacts with one of the release projections 55 the centrifugal unit 22 is turned. The main lever 71 is in rotational engagement with the release device 21 and the release device 21 is also turned. By turning of the release device the head 18 of the release element 18 is sheared off. The hydraulic fluid will go out and the connection between the driving coupling element 3 and the driven coupling element 5 is disengaged.

FIG. 4 shows the centrifugal unit 24 at a middle position and in FIG. 5 shows the centrifugal unit at an outermost position. The main lever 71 of the centrifugal unit 24 is in contact with the surface of the stop 35. So the main lever 71 has the function of a mounting for main lever 71 to limit the effective centrifugal force applied to the main lever 71.

The centrifugal device 22 is surrounded by a main housing 37 comprising a main plate 39 and a side wall 41. The main housing 37 is equipped with a mechanism to restrain the centrifugal unit 24 in a disengaged position in respect of the shifting gate 50.

The center of gravity of the centrifugal unit without the spring 32 and the spiral spring 73 is arranged on the side of the shifting gate 50. So the centrifugal unit is moving outwards by applying centrifugal force.

In the case the center of gravity is arranged not on the interacting side 72 of the centrifugal unit 24 and is arranged on the other side in respect of the rotation shaft 75 of the main lever 71, the interacting side of the centrifugal unit 24 will move inwards under the application of centrifugal force. In that case the shifting gate 50 has to be adapted thereto.

FIG. 7 shows a driveline 100 comprising a gas turbine 120 or a gas motor 110, a gear 130 and a generator 140. Such drivelines are used to provide electrical energy and to stabilize the electrical grid.

The driveline comprises a safety coupling allowing slippage at least during a predetermined angle. By the slippage over a predetermined angle it is secured that in case of a failure electrical energy is provided over a predetermined minimum of duration of time. So a collapse of an electrical grid could be avoided in case of failure of electrical energy providers.

Figure 8:
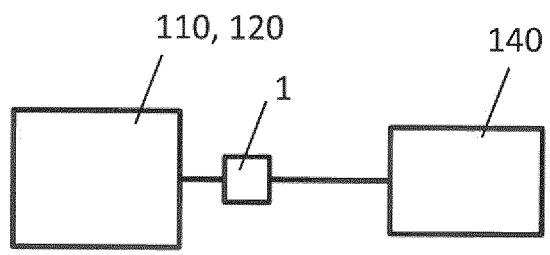
FIG. 8: shows a further driveline comprising a safety coupling of the invention.

FIG. 8 discloses a driveline 100 comprising a gas motor 110 or gas turbine 120 to drive the driving shaft 3 and a generator 140 driven by the driven shaft 5, wherein between the gas motor 110 and the generator 140 a safety coupling is arranged.

REFERENCE LIST

| | |
|---|---|
| 1 | safety coupling |
| 2 | interacting part of the safety coupling |
| 3 | driving coupling member, driving shaft |
| 5 | driven coupling member, driven shaft |
| 6 | frictional connection |

-continued

REFERENCE LIST

| | |
|---|---|
| 7 | frictional surface of driving member |
| 9 | frictional surface of driven member |
| 11 | overload protection mechanism |
| 13 | twin walled hollow sleeve |
| 15 | hydraulic fluid |
| 17 | shear tube, release element |
| 18 | head of release element/shear tube |
| 19 | hydraulic channel |
| 21 | release device |
| 22 | centrifugal device |
| 23 | supporting shaft (rotation axis in radial direction) |
| 24 | centrifugal unit |
| 29 | axial axis of supporting shaft 23 |
| 30 | spring element for preloading the main lever |
| 31 | stop lever (rotation axis orientated in tangential direction of driving element) |
| 32 | spring |
| 33 | mounting shaft of 31 |
| 34 | mounting of release element |
| 35 | centrifugal stop |
| 37 | main housing |
| 39 | main plate |
| 41 | side wall |
| 43 | stopper (31) |
| 50 | shifting gate |
| 53 | sectional projections |
| 55 | release projections |
| 57 | lower release projections |
| 61 | max. slippage at low rotational speed before release |
| 63 | slippage peaks |
| 65 | shortest slippage at high speed before release |
| 67 | longest slippage at high speed before release |
| 71 | main lever |
| 72 | interacting side |
| 73 | spiral spring |
| 75 | rotation shaft |
| 77 | first spring connection, connection with the main lever |
| 79 | second spring connection, stationary spring connection |
| 81 | mounting element of spring element |
| 83 | housing for the release element |
| 91 | axial direction |
| 93 | radial direction |
| 95 | tangential direction |
| 100 | driveline |
| 110 | gas motor |
| 120 | gas turbine |
| 130 | gear |
| 140 | generator |

The invention claimed is:

1. A safety coupling, comprising:
a driving coupling member, a driven coupling member, and a frictional connection engaging said driving coupling member with said driven coupling member;
a release element configured to disconnect said frictional connection between said driving coupling member and said driven coupling member;
a centrifugal device configured to activate said release element for disconnecting said frictional connection;
said centrifugal device having a centrifugal unit moveably disposed to interact with a shift gate in dependence on a rotational speed of said driving coupling member and a slip between said driving coupling member and said driven coupling member;
said centrifugal device having a stop disposed to limit a centrifugal force applied to said centrifugal unit; and
said centrifugal unit including a rotatably supported main lever having an interacting side disposed to move in a radial direction in dependence on the rotational speed and to interact with the shift gate.

2. The safety coupling according to claim 1, which comprises a rotation shaft supporting said main lever, said rotation shaft being tangential to at least one of said driven coupling member or said driving coupling member.

3. The safety coupling according to claim 1, which comprises a spring element preloading said main lever, wherein the interacting side of said main lever is moving in the radial direction in dependence on the rotational speed.

4. The safety coupling according to claim 1, wherein said centrifugal device comprises a release device rotatably supported relative to a supporting shaft, wherein said supporting shaft is arranged angled with respect to a rotation axis of one or both of said driving coupling member or said driven coupling member, and wherein said release device is configured to release said release element upon being moved by said centrifugal unit and to cause said release element to disconnect said frictional connection between said driving coupling member and said driven coupling member.

5. The safety coupling according to claim 4, wherein said supporting shaft is arranged in the radial direction relative to the rotation axis of one or both of said driving coupling member or said driven coupling member.

6. The safety coupling according to claim 4, wherein said centrifugal device comprises a release element housing removably connected to said release device or said centrifugal unit, wherein said release element housing is removed for exchanging said release element.

7. The safety coupling according to claim 4, wherein said stop forms a part of said release device.

8. The safety coupling according to claim 1, wherein said safety coupling is configured for use at rotational speeds of said driving coupling member in excess of 1000 rpm.

9. The safety coupling according to claim 8, wherein said safety coupling is configured for rotational speeds above 1500 rpm.

10. The safety coupling according to claim 1, wherein said shift gate comprises an even number of release projections.

11. The safety coupling according to claim 1, wherein said shift gate comprises sectional projections configured to provide a slippage before a release.

12. The safety coupling according to claim 1, wherein said shift gate comprises lower release projections.

13. The safety coupling according to claim 12, wherein said shift gate includes an even number of lower release projections.

14. A centrifugal device, comprising:
a supporting shaft connectable to a driving coupling member or to a driven coupling member;
said supporting shaft having an axis;
a centrifugal stop arranged in an axially fixed position with respect to said axis of said supporting shaft;
a rotatable main lever rotatably supported on said supporting shaft; and
a release device for releasing a frictional engagement between said driven coupling member and said driving coupling member, said release device being supported by said supporting shaft;
wherein said centrifugal stop forms a part of said release device and a center of mass of said release device is positioned on said axis of said support shaft.

15. A driveline, comprising a generator and a prime mover selected from the group consisting of a gas turbine and a gas motor, and a safety coupling according to claim 1 between said generator and said prime mover.

16. The driveline according to claim 15, further comprising a gear arranged in a connection between said prime mover and said generator.

* * * * *